United States Patent
Sakakibara et al.

(10) Patent No.: US 7,638,588 B2
(45) Date of Patent: Dec. 29, 2009

(54) FLUORORESIN AND COATED ELECTRIC WIRE

(75) Inventors: Shingo Sakakibara, Settsu (JP); Norihiko Miki, Settsu (JP); Takahiro Kitahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 274 days.

(21) Appl. No.: 10/580,404

(22) PCT Filed: Nov. 25, 2004

(86) PCT No.: PCT/JP2004/017492

§ 371 (c)(1), (2), (4) Date: May 24, 2006

(87) PCT Pub. No.: WO2005/052015

PCT Pub. Date: Jun. 9, 2005

(65) Prior Publication Data

US 2007/0149734 A1    Jun. 28, 2007

(30) Foreign Application Priority Data

Nov. 26, 2003  (JP)  ............................. 2003-396430
Sep. 21, 2004  (JP)  ............................. 2004-274065

(51) Int. Cl.
*C08F 16/24*  (2006.01)
(52) U.S. Cl. ................... 526/247; 526/250; 114/110
(58) Field of Classification Search .............. 526/242, 526/247
See application file for complete search history.

(56) References Cited

U.S. PATENT DOCUMENTS

| | | | |
|---|---|---|---|
| 5,760,151 A * | 6/1998 | Aten et al. | ................... 526/247 |
| 6,518,505 B1 * | 2/2003 | Matsui et al. | ............ 174/126.1 |
| 6,528,600 B2 | 3/2003 | Funaki et al. | |
| 6,737,490 B2 | 5/2004 | Sumi et al. | |
| 2001/0022234 A1 * | 9/2001 | Okumura et al. | ............... 174/78 |

FOREIGN PATENT DOCUMENTS

| | | |
|---|---|---|
| JP | 6-168627 | 6/1994 |
| JP | 7-182930 | 7/1995 |
| JP | 8-7672 | 1/1996 |
| JP | 10-1585 A | 1/1998 |
| JP | 2000-212365 A | 8/2000 |
| JP | 2001-288227 A | 10/2001 |
| JP | 2002-53620 A | 2/2002 |
| JP | 2002-114811 A | 4/2002 |
| JP | 2002-114884 A | 4/2002 |
| JP | 2002-173570 | 6/2002 |
| JP | 2003-192731 A | 7/2003 |

OTHER PUBLICATIONS

Machine translation of JP 2002-114884 A, Asahi Glass Co., Apr. 16, 2002.*
Machine translation Of JP 2000-212365 A, Asahi Glass Co., Aug. 2, 2000.*
Translation of JP 2002114884, translated Feb. 2009.*

* cited by examiner

*Primary Examiner*—Mark Eashoo
*Assistant Examiner*—Nicole M Buie
(74) *Attorney, Agent, or Firm*—Sughrue Mion, PLLC

(57) ABSTRACT

A fluororesin which does not cause cone break, when used for insulating a core wire having a diameter of 0.05 to 0.07 mm under the conditions of a resin temperature of 320 to 370° C., a drawdown rate [DDR] of 80 to 120, a draw rate balance [DRB] of 1.0, a wire coating speed of 700 feet/minute and an insulating thickness of 30 to 50 μm.

4 Claims, No Drawings

FLUORORESIN AND COATED ELECTRIC WIRE

TECHNICAL FIELD

This invention relates to a fluororesin and a insulated electric wire.

BACKGROUND ART

Insulated electric wires each composed of a core wire and a insulating material insulating the same as obtained by molding of a resin are required to have a smaller diameter so as to keep up with the recent increasing trend toward the reduction in size of such articles as mobile devices. Accordingly, it has become necessary to form a thin insulating material layer around the core wire with a smaller diameter.

Polyolefin resins such as polyethylene [PE] and polypropylene [PP] have been used as resins capable of forming thin-walled layers. However, insulated electric wires manufactured by using the conventional polyolefin resins have a problem in that the wall thickness reduction results in increased transmission losses.

As a result of the advancement of communication technology, insulated electric wires are required to be able to transmit large quantities of information. Therefore, it is required that the transmission loss be reduced to a minimum. A method is known for lowering the dielectric constant and thereby improving the insulating characteristics by insulating under foaming (cf. e.g. Japanese Kokai Publication H08-7672). However, such foamed insulating materials are insufficient in strength and, in addition, when the thickness is increased to overcome that drawback, a problem arises, namely it becomes difficult to reduce the insulated wire diameter.

The use of a polyolefin resin as a insulating material presents a problem from the flame retardancy viewpoint, and a method for overcoming this problem which comprises adding a flame retardant is known in the art (cf. e.g. Japanese Kokai Publication H07-182930). However, it is a problem that the addition of a flame retardant results in deteriorations in electrical characteristics.

A method is known for developing sufficient thermal stability to withstand solder reflow processes which comprises using a general-purpose polyolefin resin and curing the same (cf. e.g. Japanese Kokai Publication H06-168627). However, this requires the use of a very expensive apparatus and therefore has an economic problem.

Fluororesins, in particular fluororesins comprising tetrafluoroethylene/perfluoro(alkyl vinyl ether) copolymers [PFAs], are excellent in thermal stability, flame retardancy and electrical characteristics and are used in various fields where their characteristics can be displayed. However, PFAs have a problem in that when moldings having minute details or complicated in shape are to be obtained by injection molding, for instance, the moldings tend to undergo surface roughening.

Known as PFA species with which the problem of surface roughening on the molding surface can be solved is a PFA species reduced in molecular weight and having an adjusted molecular weight distribution (cf. e.g. Japanese Kokai Publication 2002-53620). However, when used in insulating molding, this PFA produces a problem, namely an increase in insulating speed results in worsened thin wall forming ability and in a ready tendency toward cone break.

A PFA species further reduced in molecular weight and thus in melt viscosity as well has been investigated as a PFA species with which the problem of reduced thin wall forming ability on the occasion of insulating molding at increased speeds can be resolved. It is a problem of this PFA species, however, that the reduction in molecular weight results in deteriorations in mechanical characteristics.

DISCLOSURE OF INVENTION

Problems which the Invention is to Solve

In view of the above-discussed state of the art, it is an object of the present invention to provide a fluororesin excellent in thin wall forming ability and capable of forming electric wire insulatings having good flame retardancy, thermal stability and electrical characteristics.

Means for Solving the Problems

The present invention relates to a fluororesin which does not cause cone break, when used for insulating a core wire having a diameter of 0.05 to 0.07 mm under the conditions of a resin temperature of 320 to 370° C., a drawdown rate [DDR] of 80 to 120, a draw rate balance [DRB] of 1.0, a wire coating speed of 700 feet/minute and a insulating thickness of 30 to 50 µm.

The present invention relates to a fluororesin having a critical shear rate, at 360° C., of 200 to 500 $\sec^{-1}$, wherein the fluororesin mentioned above comprises a tetrafluoroethylene/perfluoro(alkyl vinyl ether) copolymer and/or a tetrafluoroethylene/hexafluoropropylene copolymer.

The present invention relates to a fluororesin whose melt flow rate, at 372° C., exceeds 60 (g/10 minutes), wherein the fluororesin mentioned above comprises a tetrafluoroethylene/perfluoro(alkyl vinyl ether) copolymer and/or a tetrafluoroethylene/hexafluoropropylene copolymer.

The present invention relates to a insulated electric wire comprising a core wire and a insulating material obtained by insulating molding of the fluororesin mentioned above for the core wire.

In the following, the present invention is described in detail.

The fluororesin of the invention comprises a melt-processable fluoropolymer containing fluorine atoms directly bound to carbon atoms.

The "melt-processable fluoropolymer" so referred to herein has a melting point within the range of 150-350° C. and a melt viscosity of not higher than $10^6$ (pascal·sec) as measured at a temperature higher by 50° C. than the melting point thereof.

The fluororesin of the invention preferably comprises a tetrafluoroethylene-based copolymer [TFE copolymer].

The TFE copolymer is a polymer obtained by copolymerizing tetrafluoroethylene [TFE] and a comonomer other than TFE. The lower level to the content of the comonomer units other than TFE units relative to all the monomer units in the TFE copolymer may be set, for example, at 1 mole percent, and the upper limit thereto at 30 mole percent, for instance. When the comonomer other than TFE is a PAVE, which is to be mentioned later herein, the lower limit may be 0.01 mole percent and, when the comonomer other than TFE is ethylene, the upper limit may be lower than 50 mole percent.

The term "all the monomer units" as used herein indicates all monomer-derived segments constituting the molecular structure of the polymer.

The "comonomer units other than TFE units" are segments derived from the comonomer other than TFE as seen from the TFE copolymer molecular structure viewpoint. Each comonomer unit other than the TFE unit, when it is a hexafluoropropylene [HFP]-derived one, is represented by —[CF$_2$—CF(CF$_3$)]—.

The comonomer other than TFE is not particularly restricted but may be, for example, chlorotrifluoroethylene [CTFE], hexafluoropropylene [HFP], a perfluoro(alkyl vinyl ether) [PAVE] or a like perhalomonomer; Ethylene [Et], vinylidene fluoride [VdF], vinyl fluoride [VF], hexafluoroisobutene, or a hydrogen-containing monomer represented by the general formula (i):

(i)

wherein $X^2$ represents a hydrogen atom or a fluorine atom, $x^3$ represents a hydrogen atom, a fluorine atom or a chlorine atom and n represents an integer of 1 to 10. Among these, one or a combination of two or more may be used.

The PAVE mentioned above is not particularly restricted but may be, for example, perfluoro(methyl vinyl ether) [PMVE], perfluoro(ethyl vinyl ether), perfluoro(propyl vinyl ether) [PPVE], or perfluoro(butyl vinyl ether) [PBVE]. Among them, PPVE is preferred from the good thermal stability viewpoint.

The TFE copolymer may be the product obtained by polymerization of the above-mentioned TFE and comonomer other than TFE and, further, a trace amount monomer. The trace amount monomer may comprise one or a combination of two or more of such comonomers other than TFE as mentioned hereinabove.

The TFE copolymer is not particularly restricted but may be, for example, a TFE/PAVE copolymer, TFE/HFP copolymer, Et/TFE copolymer, Et/TFE/HFP copolymer or TFE/VdF/HFP copolymer. When, in the present specification, a copolymer is specified in terms of monomers, as in the case of such a copolymer as given above by way of example, the trace amount monomer is sometimes not given in accordance with established convention. It is to be noted, however, that any polymer obtained by copolymerizing a trace amount monomer in addition to the monomers indicated is not excluded.

The fluororesin of the invention preferably comprises a TFE/PAVE copolymer, TFE/HFP copolymer and/or Et/TFE copolymer.

The "TFE/PAVE copolymer, TFE/HFP copolymer and/or Et/TFE copolymer" may be the TFE/PAVE copolymer alone, TFE/HFP copolymer alone or Et/TFE copolymer alone, or a mixture of two or more copolymers selected from the group consisting of the TFE/PAVE copolymer, TFE/HFP copolymer and Et/TFE copolymer.

The above-mentioned mixture of two or more copolymers is generally produced by dry blending of two or more copolymers.

The "mixture of two or more copolymers" so referred to herein conceptually differs from the polymer alloy described later herein in that said mixture is not one obtained by melt-kneading prior to the start of insulating molding.

When the fluororesin of the invention comprises a TFE/PAVE copolymer, the perfluoro(alkyl vinyl ether) unit content relative to all monomer units constituting the TFE/PAVE copolymer is preferably 0.01 to 10 mole percent.

The "perfluoro(alkyl vinyl ether) unit" is the perfluoro(alkyl vinyl ether)-derived segment in the molecular structure of the TFE copolymer. When the perfluoro(alkyl vinyl ether) unit content is small, the crack resistance of the insulated electric wires tends to lower. As the perfluoro(alkyl vinyl ether) unit content increases, the melt flow rate [MFR] increases and the thin wall forming ability is improved but, on the other hand, the electrical characteristics tend to deteriorate and the thermal stability tends to decrease. A more preferred lower limit is 0.5 mole percent, a still more preferred lower limit is 1 mole percent, an even more preferred lower limit is 1.9 mole percent, and a most preferred lower limit is 2.5 mole percent. A more preferred upper limit is 4.5 mole percent, and a still more preferred upper limit is 4 mole percent.

It has so far been considered that increases in the PAVE content in TFE/PAVE copolymers unfavorably result in melting point lowering and in decreases in thermal stability. The fluororesin of the invention, however, even when it comprises a TFE/PAVE copolymer with a high PAVE content, is excellent in mechanical characteristics and in flame retardancy.

The fluororesin of the invention may comprise a polymer alloy obtained by using two or more copolymers selected from the group consisting of TFE/PAVE copolymers, TFE/HFP copolymers and Et/TFE copolymers.

The "polymer alloy", so referred to herein, is obtained by melt-kneading two or more polymer species prior to the start of insulating molding. The polymer alloy may be one resulting from complete mutual dissolution on the polymer chain level, or one resulting from chemical bonding between two or more polymers, or one resulting from formation, in a polymer matrix, of a domain or domains comprising a polymer(s) other than the matrix-constituting polymer(s). The size of the domain(s) is preferably not greater than 1 μm, more preferably not greater than 100 nm, per 30 μm of the polymer matrix.

When the fluororesin of the invention comprises such a polymer alloy as mentioned above, the copolymer combination includes TFE/HFP copolymer-Et/TFE copolymer, TFE/HFP copolymer-TFE/PAVE copolymer, Et/TFE copolymer-TFE/PAVE copolymer, and TFE/HFP copolymer-Et/TFE copolymer-TFE/PAVE copolymer combinations and, among them, TFE/HFP copolymer-TFE/PAVE copolymer combinations are more preferred.

When the fluororesin of the invention comprises such a TFE/HFP copolymer-TFE/PAVE copolymer polymer alloy as mentioned above and is to be used in an application field where heat resistance is required, for example in a solder reflow process, it is preferred that a TFE/PAVE copolymer be used as a base polymer and a TFE/HFP copolymer be added thereto, with the proportion of the TFE/HFP copolymer to the total weight of the polymer alloy being 3 to 40% by weight. A more preferred lower limit is 5% by weight, and a more preferred upper limit is 25% by weight.

Further, when the fluororesin of the invention is a polymer alloy comprising a TFE/PAVE copolymer and a TFE/HFP copolymer, the PAVE unit content in the polymer alloy is preferably 0.1 to 4 mole percent relative to the sum total of 100 mole percent, namely the sum total of the TFE, PAVE and HFP units constituting the whole polymer alloy.

The fluororesin of the invention may comprise the above-mentioned polymer alloy alone, or the above-mentioned mixture of two or more copolymers and the above-mentioned polymer alloy, or the above-mentioned polymer alloy in combination with a TFE/PAVE copolymer alone, a TFE/HFP copolymer alone or an Et/TFE copolymer alone in the sense that it is not the above-mentioned mixture of two or more copolymers.

In producing the above-mentioned TFE copolymer by polymerization, such known methods of polymerization as emulsion polymerization, suspension polymerization, solution polymerization and bulk polymerization can be used. From the industrial viewpoint, however, the use of suspension polymerization or emulsion polymerization is preferred.

The fluororesin of the invention may further contain a filler. The filler is not particularly restricted but includes, among others, flame retardants such as antimony oxide and calcium phosphate; coke, silica, alumina, titanium oxide, zinc oxide, magnesium oxide, magnesium hydroxide, tin oxide, calcium carbonate, magnesium carbonate, glass, talc, mica, isinglass, boron nitride and aluminum nitride.

The fluororesin of the invention may contain such a flame retardant as mentioned above. However, said fluororesin in itself has a sufficient level of flame retardancy without addition of such flame retardant, hence can be free from influences of the addition of a flame retardant such as decreases in tensile break strength, decreases in crack resistance, and deteriorations in electrical characteristics.

The fluororesin of the invention preferably has a dielectric constant of 1.8 to 2.7. A more preferred upper limit is 2.6, and a still more preferred upper limit is 2.2.

The fluororesin of the invention preferably has a dielectric loss tangent of not greater than $60 \times 10^{-4}$ as measured at 2.45 GHz, for instance. A more preferred upper limit is $10 \times 10^{-4}$, and a still more preferred upper limit is $5 \times 10^{-4}$. Within the above-mentioned range of the dielectric loss tangent, the lower limit may be set at $0.5 \times 10^{-4}$, for instance.

The above-mentioned dielectric constant and dielectric loss tangent are the values obtained by carrying out measurements by the cavity resonator oscillation method. The fluororesin of the invention can be rendered excellent in electrical characteristics such that the dielectric constant and dielectric loss tangent may be within the respective ranges given above.

From the electrical characteristics viewpoint, the fluororesin of the invention preferably comprises a perfluoropolymer with all carbon-bound hydrogen atoms having been substituted by fluorine atoms.

When the fluororesin of the invention comprises a TFE/PAVE copolymer, the dielectric constant thereof is preferably not greater than 2.2 from the electrical characteristics viewpoint, and the perfluoro(alkyl vinyl ether) unit contents relative to all the monomer units in the TFE/PAVE copolymer is preferably not lower than 0.1 mole percent, more preferably not lower than 0.5 mole percent, still more preferably not lower than 1 mole percent.

The fluororesin of the invention is high in flame retardancy, as mentioned hereinabove, and has an oxygen index generally exceeding 30, preferably an oxygen index of 90 or higher.

The above-mentioned oxygen index is the value measured in accordance with ASTM D 2863.

Generally, when the oxygen index is 25 to 27 or higher, the resin, even upon temporally exposure to fire under ordinary conditions of use as the insulating material constituting insulated electric wires, will not continue burning owing to its self-extinguishing properties.

The fluororesin of the invention may also have a critical shear rate at 360° C. of not lower than 200 $(\sec^{-1})$.

Within the above range, the upper limit to the critical shear rate may be set at 500 $(\sec^{-1})$, for instance. For increasing the insulating speed and thin wall forming ability in insulating molding, a more preferred lower limit is 220 $(\sec^{-1})$.

The fluororesin of the invention preferably has a melt flow rate [MFR] of not lower than 48 (g/10 minutes). A more preferred lower limit to the MFR is 50 (g/10 minutes), a still more preferred lower limit is 60 (g/10 minutes) or above, an even more preferred lower limit is 62 (g/10 minutes) and a most preferred lower limit is 63 (g/10 minutes). A higher MFR makes it possible to increase the insulating speed when the resin is used in insulating molding, render the resin excellent in thin wall forming ability and improve the insulating material obtained in surface smoothness and crack resistance.

Within the above range, the upper limit to the MFR can be set at 100 (g/10 minutes), for instance; from the mechanical strength viewpoint, however, the upper limit is preferably set at 85 (g/10 minutes), more preferably 81 (g/10 minutes).

The above-mentioned MFR is the value obtained by measurement under the conditions of a temperature of 372° C. and a load of 5.0 kg in accordance with ASTM D 1238.

As mentioned above, the fluororesin of the invention has a high MFR and a large number of active terminal groups at polymer chain termini and is advantageous in that the adhesion to core wires is improved. From the electrical characteristics improvement viewpoint, however, it is not desirable that the number of active terminal groups is too large. Therefore, the polymer chain termini may be subjected to fluorination treatment to an extent such that the desired electrical characteristics may be acquired. The fluorination treatment may be carried out in the conventional manner, for example by exposure to fluorine gas or heating in the presence of water.

The fluororesin of the invention preferably has a molecular weight distribution [Mw/Mn] within the range of 1 to 2. When the molecular weight distribution is within the above range, the resin, when used in insulating molding, can give insulatings improved in surface smoothness. A preferred upper limit to the molecular weight distribution [Mw/Mn] is 1.8.

The above-mentioned Mw/Mn is the value measured by the method described in Polym. Eng. Sci., 29 (1989), 645 (W. H. Tuminello).

The Mw/Mn measurement temperature is 330° C., and the method of data processing and the parameters are as described in the document cited above.

The fluororesin of the invention, when used in insulating a core wire with a diameter of 0.05 to 0.07 mm under the conditions of a resin temperature of 320 to 370° C., a wire coating speed of 700 feet/minute, a drawdown ratio [DDR] of 80 to 120, a draw ratio balance [DRB] of 1.0 and a insulating thickness of 30 to 50 µm (hereinafter, such conditions sometimes referred to as "specified insulating conditions"), will not cause cone break. If cone break occurs under the specified insulating conditions mentioned above, the insulated wire made of the core wire and a insulating material obtained by insulating molding of the resin around the core wire on the occasion of molding for insulating the core wire will become insufficient in insulating properties.

The phrase "not cause cone break" as used herein means that when a voltage of 6 kV is applied to the insulated wire obtained for a period of at least 0.15 second in accordance with JIS C 3005 using a direct current spark tester (hereinafter, such conditions sometimes referred to as "cone break detecting conditions"), the number of sparks per 1000 m is zero. When the fluororesin of the invention is used under the above-mentioned specified insulating conditions, the number of sparks per 1200 m can be rendered zero and, preferably, the number of sparks per 1500 m can be rendered zero, as evaluated under the above-mentioned cone break detecting conditions.

The resin temperature mentioned above is the temperature of the fluororesin of the invention at the cylinder tip. It is the value obtained by inserting a spring type fixed thermocouple (product of Toyo Dennetsu) into the cylinder inside and measuring the temperature there. When the resin temperature is excessively high, the insulated wire obtained may show cracking or foaming in some instances and, when it is excessively low, the insulated wire obtained may be poor in surface smoothness in some cases. A preferred lower limit to the resin temperature is 330° C., a more preferred lower limit is 340° C., a preferred upper limit is 360° C. and a more preferred upper limit is 355° C.

The insulating thickness mentioned above is the thickness of the insulating obtained after cooling to ordinary temperature of 20 to 30° C. following melt extrusion insulating with the fluororesin of the invention by insulating molding. The "insulating thickness of 30 to 50 μm" mentioned above refers to insulating under conditions such that the insulating thickness amounts to 30 to 50 μm.

Even when the upper limit to the insulating thickness is preferably set at 45 μm, more preferably at 40 μm, still more preferably at 35 μm, the fluororesin of the invention, when used in insulating under the above-mentioned specified insulating conditions, can be one causing no cone break.

The insulating thickness mentioned above is the value calculated by dividing by 2 the value obtained by subtracting the outside diameter value of the core wire measured in advance from the outside diameter value of the insulated wire as measured by means of Laser Micro Dia Meter (product of Takikawa Engineering). The fluororesin of the invention, even in the case of insulating under the above-mentioned specified insulating conditions, makes it possible to molding thin walls having such a insulating thickness as mentioned above, without causing cone break.

When a TFE/PAVE copolymer or TFE/HFP copolymer is used as the fluororesin of the invention, the value of the above-mentioned DDR is selected within the range of 80 to 120, and a preferred lower limit thereto is 96, and a preferred upper limit is 104 and the value of the DDR may be set at 100. When an Et/TFE copolymer is used as the fluororesin of the invention, the value of the DDR mentioned above is selected within the range of 30 to 70, and a preferred lower limit is 40, a preferred upper limit is 65, and the value of the DDR may be set at 60.

The "DDR" so referred to herein is the value obtained by calculating according to the formula:

$$DDR=(D_d^2-D_t^2)/(d_c^2-d_b^2)$$

wherein $D_d$ represents the die opening diameter, $D_t$ represents the chip outside diameter, $d_c$ represents the insulated wire outside diameter and $d_b$ represents the core wire outside diameter.

As for the DRB mentioned above, the tolerance zone is 0.9 to 1.1. When the DRB exceeds 1.1, cone break occurs readily and, when it is below 0.9, the insulating material hardly acquires a basically circular cross section but tends to easily acquire an elliptic section; hence, the value of 1.0 is generally selected.

The "DRB" so referred to herein is the value obtained by calculating according to the following formula:

$$DRB=(D_d/d_c)/(D_t/d_b)$$

wherein $D_d$, $D_t$, $d_c$ and $d_b$ are as defined above.

Even when the core wire has a diameter of not greater than 0.13 mm, the fluororesin of the invention can be such one that will not cause cone break when used in insulating under the above-mentioned specified insulating conditions. However, a preferred diameter is 0.05-0.11 mm and, even when the upper limit to the diameter is more preferably set at 0.08 mm, still more preferably at 0.07 mm, the fluororesin can be such one that will not cause cone break. As the core wire diameter decreases, the curvature of the wire surface increases; thus, when attempts are made to use the conventional resins in molding for insulating fine core wires, the resins show poor "spreading" on the core wires, producing the problem of cone break. On the contrary, the fluororesin of the invention will not cause cone break under the above-mentioned specified insulating conditions even if the core wire diameter is as small as 0.07 mm or smaller.

The core wire diameter mentioned above may be the value obtained by measurement using a carpenter's square or the value according to the American Wire Gauge [AWG] standard.

For checking for cone break, an electrically conductive wire is used as the above-mentioned core wire. It may be made of copper, aluminum or steel, for instance; preferably, copper is used. That the core wire has a diameter of 0.05 to 0.13 mm corresponds to the fact that the diameter is 44 to 36 as expressed in terms of the American Wire Gauge [AWG]; that the diameter is 0.11 mm corresponds to the fact that it is 37 to 38 as expressed according to the AWG; and that it is 0.07 mm corresponds to the fact that it is 41 to 42 according to the AWG.

The fluororesin of the invention is more preferably such one that will not cause cone break when a core wire having a diameter of 0.05 mm is insulated therewith under the conditions of a resin temperature of 320° C., a wire coating speed of 700 feet/minute, a DDR of 120, a DRB of 1.0 and a insulating thickness of 30 μm.

The fluororesin of the invention, when it comprises a TFE/PAVE copolymer with a perfluoro(alkyl vinyl ether) unit content of 6 to 10 mole percent relative to all the monomer units, is preferably such one that will not cause cone break upon insulating of a core wire having a diameter of 0.05 mm therewith under the conditions of a resin temperature of 320° C., a wire coating speed of 700 feet/minute, a DDR of 120, a DRB of 1.0 and a insulating thickness of 30 μm. When it comprises a TFE/PAVE copolymer with a perfluoro(alkyl vinyl ether) unit content of 1.9 to 4.5 mole percent relative to all the monomer units, it is preferably such one that will not cause cone break upon insulating of a core wire having a diameter of 0.05 mm therewith under the conditions of a resin temperature of 340° C., a wire coating speed of 700 feet/minute, a DDR of 120, a DRB of 1.0 and a insulating thickness of 30 μm.

The fluororesin of the invention will not cause cone break even when used in insulating under the above-mentioned insulating conditions, as mentioned above, and therefore is suited for insulated wire production and is particularly suited for electric wire insulating in view of its excellent electrical characteristics.

A fluororesin comprising a TFE/PAVE copolymer and/or TFE/HFP copolymer and having a critical shear rate, at 360° C., of not lower than 200 (sec$^{-1}$) is hereinafter sometimes referred to as "fluororesin (A)".

For the fluororesin (A), the upper limit to the above-mentioned critical shear rate can be set at 500 (sec$^{-1}$), for instance, within the above range and, from the viewpoint of insulating speed increasing and good thin wall forming ability on the occasion of use thereof in insulating molding, a more preferred lower limit is 220 (sec$^{-1}$).

The "critical shear rate" so referred to herein is the shear rate at the time of arrival at such a state that the fluororesin is allowed to flow out at a temperature of 360° C. through an orifice with a diameter of 1 mm and a length of 16 mm under a specific shear stress using a capillograph (product of Bohlin Instruments) begins to undergo melt fracture.

The melt fracture is a phenomenon of the extrudate becoming spiral, indefinite or discontinuous in shape or showing a sharkskin-like surface when the shear rate is excessively high on the occasion of extrusion of a viscoelastic body through a hole or slit. The occurrence or absence of melt fracture can be confirmed, for example, by using a microscope or magnifying glass at a magnification of 16.

The fluororesin (A) can be such one that the MFR thereof at 372° C. is higher than 60 (g/10 minutes).

A fluororesin comprising a TFE/PAVE copolymer and/or TFE/HFP copolymer and having an MFR at 372° C. of higher than 60 (g/10 minutes) is hereinafter sometimes referred to as "fluororesin (B)".

The fluororesin (B) has such a very high MFR as falling within the range mentioned above and, therefore, well enables the insulating speed to be increased and is particularly excellent in thin wall forming ability, so that the insulating material obtained can be further improved in surface smoothness and crack resistance.

The TFE/PAVE copolymer as a TFE copolymer constituting the fluororesin (A) or fluororesin (B) preferably has a PAVE unit content, relative to all the monomer units in the TFE/PAVE copolymer, of 1.9 to 4.5 mole percent. A more preferred lower limit to that content is 2 mole percent, a still more preferred lower limit is 2.5 mole percent, and a more preferred upper limit is 4 mole percent. When that resin is a polymer alloy comprising a TFE/PAVE copolymer and a TFE/HFP copolymer, the PAVE unit content in the polymer alloy is preferably 0.1 to 4 mole percent relative to the total sum, which is taken as 100 mole percent, of the TFE, PAVE and HFP units constituting the polymer alloy as a whole.

When it comprises a TFE/PAVE copolymer, the fluororesin (A) and fluororesin (B) shows almost no lowering either in melting start temperature or in melting point and displays excellent thermal stability in spite of the PAVE unit content being relatively high. Such excellent thermal stability is considered to be an effect of polymer formulation; no probable cause is known, however.

In the present specification, the TFE/PAVE copolymer constituting the fluororesin (A) or fluororesin (B) may be one derived from TFE and a PAVE alone or a copolymer derived from TFE and a PAVE and, further, a trace amount monomer copolymerizable with TFE and the PAVE.

In the present specification, the TFE/HFP copolymer among the TFE copolymers constituting the fluororesin (A) or fluororesin (B) may be one derived from TFE and HFP alone or a copolymer derived from TFE and HFP and, further, a trace amount monomer copolymerizable with TFE and HFP.

The trace amount monomer in the TFE/PAVE copolymer or TFE/HFP copolymer as the TFE copolymer constituting the fluororesin (A) or fluororesin (B) preferably amounts to 0.1 to 1.5 mole percent relative to all the monomer units in said TFE copolymer.

In the present specification, the TFE copolymer derived from TFE, HFP and a PAVE is referred to as "TFE/HFP copolymer" when the HFP unit content is higher than the PAVE unit content upon comparison between the HFP unit content and PAVE unit content relative to all the monomer units in the TFE copolymer or is referred to as "TFE/PAVE copolymer" when the PAVE unit content is higher than the HFP unit content.

A more preferred lower limit to the MFR, at 372° C., of the fluororesin (A) or fluororesin (B) is 63 (g/10 minutes).

The upper limit to the MFR, at 372° C., of the fluororesin (A) and fluororesin (B) may be set, for example, at 100 (g/10 minutes) within the range mentioned above. From the mechanical strength viewpoint, however, the upper limit is preferably set at 85 (g/10 minutes), more preferably at 81 (g/10 minutes).

The fluororesin (A) and fluororesin (B) both are excellent in increasing insulating speed and thin wall forming ability, so that, generally, they never cause cone break under the cone break detecting conditions mentioned above and provide electrical characteristics and flame retardancy within the same ranges as mentioned hereinabove.

Preferred as the TFE copolymer constituting the fluororesin (A) and fluororesin (B) are TFE/PAVE copolymers and, in the case of TFE/PAVE copolymers, excellent mechanical characteristics can be provided in spite of the MRF being as high as within the above range and, further, in the case of those TFE/PAVE copolymers in which the PAVE unit content relative to all the monomer units therein is 2.5 to 4 mole percent, still better mechanical characteristics can be provided and the MIT folding endurance, for example, can amount to at least 4000 cycles.

For determining the above-mentioned MIT folding endurance, films (thickness 220 μm×width 13 mm) prepared by using the fluororesin in question are subjected to measurements using a folding tester (product of Yasuda-Seiki-Seisakusho) in accordance with ASTM D 2176.

The "fluororesin" simply so referred to herein without adding (A) or (B) conceptually includes not only the fluororesin (A) and fluororesin (B) but also all other fluororesins falling within the scope of the present invention.

The fluororesin of the invention is preferably a fluororesin for electric wire insulating.

The insulated electric wire of the invention comprises a core wire and a insulating material obtained by molding the fluororesin of the invention so as to insulate the core wire.

The insulated electric wire of the invention has a insulating formed from the fluororesin of the invention as the insulating material and, therefore, can have sufficient thermal stability to endure solder reflow processes.

The insulated electric wire of the invention can be produced with ease by using the fluororesin of the invention as the insulating material, as mentioned above, even when the core wire has a diameter of 0.13 mm or smaller. A preferred upper limit to the core wire diameter is 0.08 mm and a more preferred upper limit is 0.07 mm. The insulated electric wire of the invention preferably has a core wire diameter of not smaller than 0.02 mm.

As the core wire material, there may be mentioned copper, aluminum and steel, among others, and, from the viewpoint of adhesion to the insulating material, copper is preferred.

The insulating material preferably has a thickness of 10 to 60 μm. A more preferred lower limit is 15 μm, a still more preferred lower limit is 20 μm, a more preferred upper limit is 55 μm, and a still more preferred upper limit is 50 μm.

The insulating material thickness mentioned above is the value after cooling to ordinary temperature, namely 20 to 30° C. following insulating.

The insulating material of the insulated electric wire of the invention can have such a thin wall thickness as mentioned above, and the crack resistance of the insulating material can be improved.

The above-mentioned insulating material thickness is the value obtained by dividing, by 2, the value resulting from subtraction of the core wire outside diameter measured in advance from the outside diameter of the insulated electric wire as measured using Laser Micro Dia Meter (product of Takikawa Engineering), like the insulating thickness mentioned hereinabove under the specific insulating conditions.

The insulated electric wire of the invention is suitably used as a coaxial cable. The coaxial cable can be a small-diameter coaxial cable as well and can also cope with the reduction in size of mobile devices such as cellular phones, for instance. In the case of folding type cellular phones, there are restrictions as to the structure of their folding portion; a thick layer is required for strength improvement and, on the other hand, a thin wall is required. The insulated electric wire of the invention can be adequately used under such circumstances.

The insulated electric wire of the invention can also be suitably used as an image sending wire in a video microscope for medical use.

Effects Of The Invention

The fluororesin of the invention, which has the constitution described above, is excellent in thin wall forming ability and can form an electric wire insulating material having good flame retardancy, thermal stability and electrical characteristics.

BEST MODES FOR CARRYING OUT THE INVENTION

The following examples illustrate the present invention more specifically. These examples are, however, by no means limitative of the scope of the invention.

SYNTHESIS EXAMPLE 1

Synthesis of Fluororesin F-1

A 174-liter autoclave was charged with 34 L of distilled water and, after sufficient nitrogen substitution, further charged with 30.4 kg of perfluorocyclobutane, 0.95 kg of perfluoro(propyl vinyl ether) ($CF_2$=$CFOCF_2CF_2CF_3$) [PPVE] and 4.5 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.065-kg portions, at 1-hour intervals. The polymerization was continued in this manner for 28 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-1 in pellet form.

SYNTHESIS EXAMPLE 2

Synthesis of Fluororesin F-2

A 174-liter autoclave was charged with 34 L of distilled water and, after sufficient nitrogen substitution, further charged with 30.4 kg of perfluorocyclobutane, 1.98 kg of PPVE and 4.0 kg of methanol, and the system inside temperature was maintained at 35° C. and the rate of stirring at 200 rpm. Then, TFE was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.117-kg portions, at 1-hour intervals. The polymerization was continued in this manner for 28 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-2 in pellet form.

SYNTHESIS EXAMPLE 3

Synthesis of Fluororesin F-3

A 174-liter autoclave was charged with 43 L of distilled water and, after sufficient nitrogen substitution, further charged with 43 kg of hexafluoropropylene [HFP], 0.42 kg of PPVE and 0.45 kg of methanol, and the system inside temperature was maintained at 25.5° C. and the rate of stirring at 200 rpm. Then, tetrafluoroethylene [TFE] was fed under pressure until arrival at 0.83 MPa, followed by charging of 1.8 kg of a 8% (by weight) solution of the polymerization initiator $(H(CF_2CF_2)_3COO)_2$ in perfluorocyclohexane to initiate the polymerization. Since otherwise the system inside pressure would decrease as the progress of the polymerization, TFE was continuously fed to maintain the system inside pressure at 0.83 MPa. During polymerization, the 8% (by weight) solution of $(H(CF_2CF_2)_3COO)_2$ in perfluorocyclohexane was added, in 0.15-kg portions, at 2-hour intervals until the lapse of 6 hours after the start of polymerization and, then, in 0.13-kg portions, at 2.5-hour intervals until the completion of polymerization. At 1.5 hours after the start of polymerization, 0.45 kg of methanol was added and, then, methanol was added, in 0.45-kg portions, at 10-hour intervals. PPVE was added, in 0.12-kg portions, at 8-hour intervals (0.36 kg in total). The polymerization was continued in this manner for 35 hours. After pressure release to atmospheric pressure, the reaction product obtained was washed with water and dried to give 50 kg of a powder.

This powder was pelletized under the melt-kneading and pellet heating conditions shown in Table 1 to give fluororesin F-3 in pellet form.

SYNTHESIS EXAMPLE 4

Synthesis of Fluororesin F-4

A 174-liter autoclave was charged with 43 L of distilled water and, after sufficient nitrogen substitution, further charged with 43 kg of HFP and 0.55 kg of methanol, and the system inside temperature was maintained at 25.5° C. and the rate of stirring at 200 rpm. Then, TFE was fed under pressure until arrival at 0.83 MPa, followed by charging of 0.54 kg of a 8% (by weight) solution of the polymerization initiator $(H(CF_2CF_2)_3COO)_2$ in perfluorocyclohexane to initiate the polymerization. Since otherwise the system inside pressure would decrease as the progress of the polymerization, TFE was continuously fed to maintain the system inside pressure at 0.83 MPa. During polymerization, the 8% (by weight) solution of $(H(CF_2CF_2)_3COO)_2$ in perfluorocyclohexane was added, in 0.10-kg portions, at 2-hour intervals until the lapse of 6 hours after the start of polymerization and, then, in 0.08-kg portions, at 2.5-hour intervals until the completion of polymerization. At 1.5 hours after the start of polymerization, 0.55 kg of methanol was added and, then, methanol was added, in 0.55-kg portions, at 10-hour intervals. The polymerization was continued in this manner for 37 hours. After pressure release to atmospheric pressure, the reaction product obtained was washed with water and dried to give 55 kg of a powder.

This powder was pelletized under the melt-kneading and pellet heating conditions shown in Table 1 to give fluororesin F-4 in pellet form.

SYNTHESIS EXAMPLE 5

Synthesis of Fluororesin F-5

A 174-liter autoclave was charged with 43 L of distilled water and, after sufficient nitrogen substitution, further charged with 43 kg of HFP and 0.24 kg of methanol, and the system inside temperature was maintained at 25.5° C. and the rate of stirring at 200 rpm. Then, TFE was fed under pressure until arrival at 0.83 MPa, followed by charging of 0.54 kg of a 8% (by weight) solution of the polymerization initiator $(H(CF_2CF_2)_3COO)_2$ in perfluorocyclohexane to initiate the polymerization. Since otherwise the system inside pressure would decrease as the progress of the polymerization, TFE was continuously fed to maintain the system inside pressure at 0.83 MPa. During polymerization, the 8% (by weight) solution of $(H(CF_2CF_2)_3COO)_2$ in perfluorocyclohexane was added, in 0.10-kg portions, at 2-hour intervals until the lapse of 6 hours after the start of polymerization and, then, in 0.08-kg portions, at 2.5-hour intervals until the completion of polymerization. At 1.5 hours after the start of polymerization, 0.24 kg of methanol was added and, then, methanol was added, in 0.24-kg portions, at 10-hour intervals. The polymerization was continued in this manner for 37 hours. After pressure release to atmospheric pressure, the reaction product obtained was washed with water and dried to give 55 kg of a powder.

This powder was pelletized under the melt-kneading and pellet heating conditions shown in Table 1 to give fluororesin F-5 in pellet form.

SYNTHESIS EXAMPLE 6

Synthesis of Fluororesin F-6

A 14-kg portion of the powder of Synthesis Example 1 was dry-blended with 1.1 kg of the powder of Synthesis Example 5 using a Henschel mixer, and the mixture was pelletized under the melt-kneading and pellet heating conditions shown in Table 1 to give fluororesin F-6 in pellet form.

SYNTHESIS EXAMPLE 7

Synthesis of Fluororesin F-7

A 14-kg portion of the powder of Synthesis Example 1 was dry-blended with 2.9 kg of the powder of Synthesis Example 5 using a Henschel mixer, and the mixture was pelletized under the melt-kneading and pellet heating conditions shown in Table 1 to give fluororesin F-7 in pellet form.

SYNTHESIS EXAMPLE 8

Synthesis of Fluororesin F-8

A 174-liter autoclave was charged with 47 L of distilled water and, after sufficient nitrogen substitution, further charged with 33.9 kg of perfluorocyclobutane, 5.5 kg of HFP, 0.91 kg of PPVE and 5.0 kg of methanol, and the system inside temperature was maintained at 35° C. and the rate of stirring at 200 rpm. Then, TFE was fed under pressure until arrival at 0.75 MPa, followed by charging of 0.18 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.026-kg portions, at 1-hour intervals. The polymerization was continued in this manner for 28 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-8 in pellet form.

SYNTHESIS EXAMPLE 9

Synthesis of Fluororesin F-9

A 174-liter autoclave was charged with 27 L of distilled water and, after sufficient nitrogen substitution, further charged with 30.4 kg of perfluorocyclobutane, 1.4 kg of PPVE and 1.0 kg of methanol, and the system inside temperature was maintained at 35° C. and the rate of stirring at 200 rpm. Then, TFE was fed under pressure until arrival at 0.6 MPa, followed by charging of 0.03 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.065-kg portions, at 1-hour intervals. The polymerization was continued in this manner for 28 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-9 in pellet form.

SYNTHESIS EXAMPLE 10

Synthesis of Fluororesin F-10

A 14-kg portion of the powder of Synthesis Example 4 was dry-blended with 1.6 kg of the powder of Synthesis Example 9 using a Henschel mixer, and the mixture was pelletized under the melt-kneading and pellet heating conditions shown in Table 1 to give fluororesin F-10 in pellet form.

SYNTHESIS EXAMPLE 11

Synthesis of Fluororesin F-11

A 174-liter autoclave was charged with 51 L of distilled water and, after sufficient nitrogen substitution, further charged with 32 kg of perfluorocyclobutane, 0.25 kg of cyclohexane and 0.34 kg of 2,3,3,4,4,5,5-heptafluoro-1-pentene $(CH_2=CFCF_2CF_2CF_2H)$, and the system inside temperature was maintained at 20° C. and the rate of stirring at 200 rpm. Then, tetrafluoroethylene was fed under pressure until arrival at 0.67 MPa and, further, ethylene [Et] was fed under pressure until arrival at 0.86 MPa. The system inside temperature was then raised to 35° C., the system inside pressure was raised to 1.2 MPa and 0.18 kg of a 50% methanol solution of di-n-propyl peroxydicarbonate was added to initiate the polymerization. Since otherwise the system inside pressure would decrease as the progress of the polymerization, a gas composed of TFE and Et in a mole ratio of 55:45 was continuously fed to maintain the system inside pressure at 1.2 MPa. The polymerization was continued in this manner for 45 hours. After pressure release to atmospheric pressure, water was removed. Then, 51 L of distilled water was added, 0.61 kg of a 28% (by weight) aqueous ammonia was added, the system inside temperature was raised to 80° C., and the mixture was stirred at 200 rpm for 3 hours. After pressure release to atmospheric pressure, the reaction product obtained was washed with water and dried to give 25 kg of a powder.

This powder was pelletized under the melt-kneading and pellet heating conditions shown in Table 1 to give fluororesin F-11 in pellet form.

SYNTHESIS EXAMPLE 12

Synthesis of Fluororesin F-12

A 174-liter autoclave was charged with 34 L of distilled water and, after sufficient nitrogen substitution, further charged with 30.4 kg of perfluorocyclobutane, 1.42 kg of perfluoro (propyl vinyl ether) ($CF_2$=$CFOCF_2CF_2CF_3$) [PPVE] and 3.0 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.072-kg portions, at 1-hour intervals. The polymerization was continued in this manner for 26 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-12 in pellet form.

SYNTHESIS EXAMPLE 13

Synthesis of Fluororesin F-13

A 174-liter autoclave was charged with 34 L of distilled water and, after sufficient nitrogen substitution, further charged with 30.4 kg of perfluorocyclobutane, 1.42 kg of perfluoro(propyl vinyl ether) ($CF_2$=$CFOCF_2CF_2CF_3$) [PPVE] and 3.2 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.072-kg portions, at 1-hour intervals. The polymerization was continued in this manner for 25 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-13 in pellet form.

SYNTHESIS EXAMPLE 14

Synthesis of Fluororesin F-14

A 174-liter autoclave was charged with 34 L of distilled water and, after sufficient nitrogen substitution, further charged with 30.4 kg of perfluorocyclobutane, 1.42 kg of perfluoro(propyl vinyl ether) ($CF_2$=$CFOCF_2CF_2CF_3$) [PPVE] and 3.6 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.072-kg portions, at 1-hour intervals. The polymerization was continued in this manner for 26 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-14 in pellet form.

SYNTHESIS EXAMPLE 15

Synthesis of Fluororesin F-15

A 174-liter autoclave was charged with 34 L of distilled water and, after sufficient nitrogen substitution, further charged with 30.4 kg of perfluorocyclobutane, 1.60 kg of perfluoro(propyl vinyl ether) ($CF_2$=$CFOCF_2CF_2CF_3$) [PPVE] and 3.6 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.080-kg portions, at 1-hour intervals. The polymerization was continued in this manner for 26 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-15 in pellet form.

SYNTHESIS EXAMPLE 16

Synthesis of Fluororesin F-16

A 174-liter autoclave was charged with 34 L of distilled water and, after sufficient nitrogen substitution, further charged with 30.4 kg of perfluorocyclobutane, 0.84 kg of perfluoro(propyl vinyl ether) ($CF_2$=$CFOCF_2CF_2CF_3$) [PPVE] and 4.6 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.052-kg portions, at 1-hour intervals. The polymerization was continued in this manner for 23 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-16 in pellet form.

SYNTHESIS EXAMPLE 17

Synthesis of Fluororesin F-17

A 174-liter autoclave was charged with 34 L of distilled water and, after sufficient nitrogen substitution, further charged with 30.4 kg of perfluorocyclobutane, 0.84 kg of perfluoro(propyl vinyl ether) ($CF_2=CFOCF_2CF_2CF_3$) [PPVE] and 3.5 kg of methanol, and the system inside temperature was maintained at 35° C. and the rate of stirring at 200 rpm. Then, tetrafluoroethylene [TFE] was fed under pressure until arrival at 0.6 MPa, followed by charging of 0.06 kg of a 50% methanol solution of di-n-propyl peroxydicarbonate to initiate the polymerization. Since otherwise the system inside pressure would decrease as the progress of the polymerization, TFE was continuously fed to maintain the pressure while PPVE was added, in 0.052-kg portions, at 1-hour intervals. The polymerization was continued in this manner for 23 hours. After pressure release to atmospheric pressure, the reaction product obtained was washed with water and dried to give 30 kg of a powder.

This powder was pelletized under the melt-kneading and pellet heating conditions shown in Table 1 to give fluororesin F-17 in pellet form.

SYNTHESIS EXAMPLE 18

Synthesis of Fluororesin F-18

A 174-liter autoclave was charged with 43 L of distilled water and, after sufficient nitrogen substitution, further charged with 43 kg of hexafluoropropylene [HFP], 1.15 kg of PPVE and 0.85 kg of methanol, and the system inside temperature was maintained at 25.5° C. and the rate of stirring at 200 rpm. Then, TFE was fed under pressure until arrival at 0.83 MPa, followed by charging of 1.8 kg of a 8% (by weight) solution of the polymerization initiator ($H(CF_2CF_2)_3COO)_2$ in perfluorocyclohexane to initiate the polymerization. Since otherwise the system inside pressure would decrease as the progress of the polymerization, TFE was continuously fed to maintain the system inside pressure at 0.83 MPa. During polymerization, the 8% (by weight) solution of $(H(CF_2CF_2)_3COO)_2$ in perfluorocyclohexane was added, in 0.15-kg portions, at 2-hour intervals until the lapse of 6 hours after the start of polymerization and, then, in 0.13-kg portions, at 2.5-hour intervals until the completion of polymerization. At 1.5 hours after the start of polymerization, 0.85 kg of methanol was added and, then, methanol was added, in 0.85-kg portions, at 10-hour intervals. PPVE was added, in 0.25 kg portions, at 8-hour intervals (0.75 kg in total). The polymerization was continued in this manner for 35 hours. After pressure release to atmospheric pressure, the reaction product obtained was washed with water and dried to give 50 kg of a powder.

This powder was pelletized under the melt-kneading and pellet heating conditions shown in Table 1 to give fluororesin F-18 in pellet form.

TABLE 1

| | Melt-kneading and extrusion conditions | | | | | | | Pellet heating conditions | |
| --- | --- | --- | --- | --- | --- | --- | --- | --- | --- |
| | C1 [° C.] | C2 [° C.] | C3 [° C.] | C4 [° C.] | AD [° C.] | D [° C.] | Number of screw revolutions [rpm] | Temperature [° C.] | Time [hr] |
| Synthesis Example 1 | 320 | 340 | 340 | 340 | 345 | 345 | 15 | 200 | 8 |
| Synthesis Example 2 | 310 | 340 | 340 | 340 | 345 | 345 | 15 | 200 | 8 |
| Synthesis Example 3 | 290 | 330 | 340 | 340 | 345 | 340 | 15 | 150 | 24 |
| Synthesis Example 4 | 280 | 320 | 340 | 340 | 340 | 340 | 15 | 150 | 24 |
| Synthesis Example 5 | 290 | 330 | 340 | 340 | 345 | 345 | 15 | 150 | 24 |
| Synthesis Example 6 | 320 | 340 | 340 | 340 | 345 | 345 | 15 | 200 | 8 |
| Synthesis Example 7 | 320 | 340 | 340 | 340 | 345 | 340 | 15 | 200 | 8 |
| Synthesis Example 8 | 320 | 340 | 340 | 340 | 345 | 340 | 15 | 200 | 8 |
| Synthesis Example 9 | 330 | 340 | 350 | 350 | 360 | 350 | 15 | 200 | 8 |
| Synthesis Example 10 | 280 | 320 | 340 | 340 | 340 | 340 | 15 | 150 | 24 |
| Synthesis Example 11 | 250 | 265 | 265 | 275 | 280 | 280 | 25 | 150 | 8 |
| Synthesis Example 12 | 320 | 340 | 340 | 340 | 345 | 340 | 15 | 200 | 8 |
| Synthesis Example 13 | 320 | 340 | 340 | 340 | 345 | 340 | 15 | 200 | 8 |
| Synthesis Example 14 | 320 | 340 | 340 | 340 | 345 | 340 | 15 | 200 | 8 |
| Synthesis Example 15 | 310 | 340 | 340 | 340 | 345 | 340 | 15 | 200 | 8 |

TABLE 1-continued

|  | Melt-kneading and extrusion conditions | | | | | | | Pellet heating conditions | |
| --- | --- | --- | --- | --- | --- | --- | --- | --- | --- |
|  | C1 [° C.] | C2 [° C.] | C3 [° C.] | C4 [° C.] | AD [° C.] | D [° C.] | Number of screw revolutions [rpm] | Temperature [° C.] | Time [hr] |
| Synthesis Example 16 | 320 | 340 | 340 | 340 | 345 | 340 | 15 | 200 | 8 |
| Synthesis Example 17 | 320 | 340 | 340 | 340 | 345 | 340 | 15 | 200 | 8 |
| Synthesis Example 18 | 280 | 320 | 340 | 340 | 345 | 340 | 15 | 150 | 24 |

In Table 1, C1, C2, C3 and C4 respectively indicate four temperature-measuring sites on the cylinder. The temperature-measuring sites are positioned in that order at even intervals, C1 being remotest from and C4 being closest to the injection hole. In Table 1, AD denotes the adapter temperature, and D denotes the die temperature.

The fluororesins obtained in the synthesis examples were evaluated for the following physical characteristics.

(1) Fluororesin Composition Determination

The composition of each fluororesin was determined by $^{19}$F NMR analysis.

(2) Melting Point (Tm) Determination

Using a Seiko model differential scanning calorimeter [DSC], the melting peak appearing upon raising the temperature at a rate of 10° C./minute was recorded, and the temperature corresponding to the maximum was reported as the melting point (Tm).

(3) Melt Flow Rate [MFR] Measurement of Each Fluororesin

Using a melt indexer (product of Toyo Seiki Seisakusho), the weight (g) of the polymer forced through a nozzle having a diameter of 2 mm and a length of 8 mm in unit time (10 minutes) under a load of 5 kg was measured at the measurement temperature indicated.

The results are shown in Table 2.

TABLE 2

|  | Resin species | Composition [mole ratio] | Melting point [° C.] | MFR[g/10 minute] (measurement temperature) |
| --- | --- | --- | --- | --- |
| Synthesis Example 1 | Fluororesin F-1 | TFE/PPVE = 98.0/2.0 | 300 | 63 (372° C.) |
| Synthesis Example 2 | Fluororesin F-2 | TFE/PPVE = 96.5/3.5 | 297 | 67 (372° C.) |
| Synthesis Example 3 | Fluororesin F-3 | TFE/HFP/ PPVE = 92.7/6.9/0.4 | 270 | 36 (372° C.) |
| Synthesis Example 4 | Fluororesin F-4 | TFE/HFP = 92.0/8.0 | 265 | 48 (372° C.) |
| Synthesis Example 5 | Fluororesin F-5 | TFE/HFP = 92.0/8.0 | 265 | 6 (372° C.) |
| Synthesis Example 6 | Fluororesin F-6 (= F-1 + F-5) | TFE/HFP/ PPVE = 97.7/0.6/1.7 | 296 | 45 (372° C.) |
| Synthesis Example 7 | Fluororesin F-7 (= F-1 + F-5) | TFE/HFP/ PPVE = 97.2/1.4/1.4 | 293 | 39 (372° C.) |
| Synthesis Example 8 | Fluororesin F-8 | TFE/HFP/ PPVE = 98.1/1.1/0.8 | 300 | 49 (372° C.) |
| Synthesis Example 9 | Fluororesin F-9 | TFE/PPVE = 98.0/2.0 | 300 | 8 (372° C.) |

TABLE 2-continued

|  | Resin species | Composition [mole ratio] | Melting point [° C.] | MFR[g/10 minute] (measurement temperature) |
| --- | --- | --- | --- | --- |
| Synthesis Example 10 | Fluororesin F-10 (= F-4 + F-9) | TFE/HFP/ PPVE = 92.6/7.2/0.2 | 269 | 40 (372° C.) |
| Synthesis Example 11 | Fluororesin F-11 | TFE/Et/ H2P = 54.1/43.4/2.5 | 257 | 35 (297° C.) |
| Synthesis Example 12 | Fluororesin F-12 | TFE/PPVE = 97.4/2.6 | 300 | 63 (372° C.) |
| Synthesis Example 13 | Fluororesin F-13 | TFE/PPVE = 97.4/2.6 | 300 | 67 (372° C.) |
| Synthesis Example 14 | Fluororesin F-14 | TFE/PPVE = 97.4/2.6 | 300 | 77 (372° C.) |
| Synthesis Example 15 | Fluororesin F-15 | TFE/PPVE = 97.1/2.9 | 300 | 90 (372° C.) |
| Synthesis Example 16 | Fluororesin F-16 | TFE/PPVE = 98.4/1.6 | 301 | 63 (372° C.) |
| Synthesis Example 17 | Fluororesin F-17 | TFE/PPVE = 98.4/1.6 | 301 | 46 (372° C.) |
| Synthesis Example 18 | Fluororesin F-18 | TFE/HFP/ PPVE = 92.0/6.9/1.1 | 265 | 70 (372° C.) |

EXAMPLE 1

Using the fluororesin F-1 prepared in Synthesis Example 1, insulating molding was performed with a copper wire (0.07 mm in diameter) as the core wire under the molding conditions shown in Table 3.

The dielectric constant, dielectric loss tangent and oxygen index were measured by the methods given below. The measurement results are shown in Table 4.

(4) Measurements of Dielectric Constant and Dielectric Loss Tangent of Each Fluororesin Measurements were made using a cavity resonator oscillation apparatus (product of Kanto Denshi Oyo Kaihatsu (KEAD)). The measurement frequency was 2.45 GHz, and the sample subjected to measurements had the shape of a square bar, 1.8 mm×1.8 mm×130 mm.

(5) Oxygen Index

The method of ASTM D 2863 was followed.

EXAMPLE 2

Using the fluororesin F-2 prepared in Synthesis Example 2, a insulating material was produced under the same extrusion conditions as in Example 1, and evaluations were made by the same evaluation methods as used in Example 1. The results are shown in Table 4.

EXAMPLE 3

Using the fluororesin F-3 prepared in Synthesis Example 3, a insulating material was produced under the same extrusion conditions as in Example 1, and evaluations were made by the same evaluation methods as used in Example 1. The results are shown in Table 4.

EXAMPLE 4

Using the fluororesin F-4 prepared in Synthesis Example 4, a insulating material was produced under the same extrusion conditions as in Example 1, and evaluations were made by the same evaluation methods as used in Example 1. The results are shown in Table 4.

EXAMPLE 5

Using the fluororesin F-6 prepared in Synthesis Example 6, a insulating material was produced under the same extrusion conditions as in Example 1, and evaluations were made by the same evaluation methods as used in Example 1. The results are shown in Table 4.

EXAMPLE 6

Using the fluororesin F-7 prepared in Synthesis Example 7, a insulating material was produced under the same extrusion conditions as in Example 1, and evaluations were made by the same evaluation methods as used in Example 1. The results are shown in Table 4.

EXAMPLE 7

Using the fluororesin F-8 prepared in Synthesis Example 8, a insulating material was produced under the same extrusion conditions as in Example 1, and evaluations were made by the same evaluation methods as used in Example 1. The results are shown in Table 4.

EXAMPLE 8

Using the fluororesin F-10 prepared in Synthesis Example 10, a insulating material was produced under the same extrusion conditions as in Example 1, and evaluations were made by the same evaluation methods as used in Example 1. The results are shown in Table 4.

EXAMPLE 9

Using the fluororesin F-11 prepared in Synthesis Example 11, a insulating material was produced under the same extrusion conditions as in Example 1 except that the extrusion speed was 3.5 (g/minute), and evaluations were made by the same evaluation methods as used in Example 1. The results are shown in Table 4.

EXAMPLE 10

Using the fluororesin F-12 prepared in Synthesis Example 12, a insulating material was produced under the same extrusion conditions as in Example 1, and evaluations were made by the same evaluation methods as used in Example 1. The results are shown in Table 4.

EXAMPLE 11

Using the fluororesin F-13 prepared in Synthesis Example 13, a insulating material was produced under the same extrusion conditions as in Example 1, and evaluations were made by the same evaluation methods as used in Example 1. The results are shown in Table 4.

EXAMPLE 12

Using the fluororesin F-14 prepared in Synthesis Example 14, a insulating material was produced under the same extrusion conditions as in Example 1, and evaluations were made by the same evaluation methods as used in Example 1. The results are shown in Table 4.

EXAMPLE 13

Using the fluororesin F-15 prepared in Synthesis Example 15, a insulating material was produced under the same extrusion conditions as in Example 1, and evaluations were made by the same evaluation methods as used in Example 1. The results are shown in Table 4.

EXAMPLE 14

Using the fluororesin F-16 prepared in Synthesis Example 16, a insulating material was produced under the same extrusion conditions as in Example 1, and evaluations were made by the same evaluation methods as used in Example 1. The results are shown in Table 4.

EXAMPLE 15

Using the fluororesin F-17 prepared in Synthesis Example 17, a insulating material was produced under the same extrusion conditions as in Example 1, and evaluations were made by the same evaluation methods as used in Example 1. The results are shown in Table 4.

EXAMPLE 16

Using the fluororesin F-18 prepared in Synthesis Example 18, a insulating material was produced under the same extrusion conditions as in Example 1, and evaluations were made by the same evaluation methods as used in Example 1. The results are shown in Table 4.

COMPARATIVE EXAMPLE 1

Low-density polyethylene (50% by weight; Mirason 3530, density: 0.925 g/cm$^3$, MFR: 0.25 (g/10 minutes), product of Du Pont-Mitsui Polychemicals) and magnesium hydroxide (50% by weight) were formulated and mixed up, and the mixture was used for insulating molding under the temperature and extrusion conditions shown in Table 3. Then, evaluations were performed by the same evaluation methods as used in Example 1. The results are shown in Table 4.

COMPARATIVE EXAMPLE 2

High-density polyethylene (50% by weight; Hizex 7500 M, density: 0.957 g/cm$^3$, MFR: 0.03 (g/10 minutes), product of Sumitomo-Mitsui Polyolefins) and magnesium hydroxide (50% by weight) were formulated and mixed up, and the mixture was used for insulating molding under the temperature and extrusion conditions shown in Table 3. Then, evaluations were performed by the same evaluation methods as used in Example 1. The results are shown in Table 4.

TABLE 3

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Comparative Example 1 | Comparative Example 2 |
|---|---|---|---|---|---|---|---|---|---|---|---|---|---|---|---|---|---|---|
| Resin species | Fluororesin F-1 | Fluororesin F-2 | Fluororesin F-3 | Fluororesin F-4 | Fluororesin F-6 (F-1 + F-5) | Fluororesin F-7 (F-1 + F-5) | Fluororesin F-8 | Fluororesin F-10 (F-4 + F-9) | Fluororesin F-11 | Fluororesin F-12 | Fluororesin F-13 | Fluororesin F-14 | Fluororesin F-15 | Fluororesin F-16 | Fluororesin F-17 | Fluororesin F-18 | Low-density polyethylene | High-density polyethylene |
| Melt-kneading temperature conditions C1[°C.] | 300 | 300 | 280 | 280 | 300 | 300 | 300 | 280 | 280 | 300 | 300 | 300 | 300 | 300 | 300 | 280 | 180 | 180 |
| C2[°C.] | 330 | 330 | 330 | 320 | 330 | 330 | 330 | 320 | 300 | 330 | 330 | 330 | 330 | 330 | 330 | 320 | 200 | 200 |
| C3[°C.] | 340 | 340 | 340 | 340 | 340 | 340 | 340 | 340 | 300 | 340 | 340 | 340 | 340 | 340 | 340 | 340 | 210 | 210 |
| C4[°C.] | 350 | 350 | 350 | 350 | 350 | 350 | 350 | 350 | 310 | 350 | 350 | 350 | 350 | 350 | 350 | 350 | 230 | 230 |
| C5[°C.] | 350 | 350 | 350 | 350 | 350 | 350 | 350 | 350 | 320 | 350 | 350 | 350 | 350 | 350 | 350 | 350 | 250 | 250 |
| AD[°C.] | 350 | 350 | 350 | 350 | 350 | 350 | 350 | 350 | 320 | 350 | 350 | 350 | 350 | 350 | 350 | 350 | 245 | 245 |
| D[°C.] | 350 | 350 | 350 | 350 | 350 | 350 | 350 | 350 | 350 | 350 | 350 | 350 | 350 | 350 | 350 | 350 | 245 | 245 |
| Resin temperature [°C.] | | | | | | | | | | | | | | | | | | |
| Extrusion conditions Extrusion speed [g/minute] | 4.2 | 4.2 | 4.2 | 4.2 | 4.2 | 4.2 | 4.2 | 4.2 | 3.5 | 4.2 | 4.2 | 4.2 | 4.2 | 4.2 | 4.2 | 4.2 | 1.9 | 2.0 |
| Core wire diameter [mmϕ] | | | | | | | | | | 0.07 | | | | | | | | |
| Wire coating speed [feet/minute] | | | | | | | | | | 700 | | | | | | | | |
| Insulating thickness [μm] | | | | | | | | | | 30 | | | | | | | | |
| Extruder Cylinder diameter [mm] | | | | | | | | | | 35 | | | | | | | | |
| Screw L/D ratio [-] | | | | | | | | | | 24 | | | | | | | | |
| Screw CR | | | | | | | | | | 3 | | | | | | | | |
| Die Inside diameter/tip outside diameter [mm/mm] | | | | | | | | | | 1.3/0.7 | | | | | | | | |
| Condition of core insulating | | | | | | | | | No core break | | | | | | | | Cone break occurred | Cone break occurred |

In Table 3, C1, C2, C3, C4 and C5 respectively indicate five temperature-measuring sites on the cylinder. The temperature-measuring sites are positioned in that order at even intervals, C1 being remotest from and C4 being closest to the injection hole. In Table 3, AD denotes the adapter temperature, and D denotes the die temperature.

TABLE 4

| | Resin species | Dielectric constant | Dielectric loss tangent (× $10^4$) | Oxygen index |
|---|---|---|---|---|
| Example 1 | Fluororesin F-1 | 2.1 | 4 | 96 |
| Example 2 | Fluororesin F-2 | 2.1 | 4 | 95 |
| Example 3 | Fluororesin F-3 | 2.1 | 5 | 95 |
| Example 4 | Fluororesin F-4 | 2.1 | 5 | 94 |
| Example 5 | Fluororesin F-6 (= F-1 + F-5) | 2.1 | 4 | 95 |
| Example 6 | Fluororesin F-7 (= F-1 + F-5) | 2.1 | 4 | 95 |
| Example 7 | Fluororesin F-8 | 2.1 | 4 | 95 |
| Example 8 | Fluororesin F-10 (= F-4 + F-9) | 2.1 | 5 | 96 |
| Example 9 | Fluororesin F-11 | 2.6 | 50 | 31 |
| Example 10 | Fluororesin F-12 | 2.1 | 4 | 96 |
| Example 11 | Fluororesin F-13 | 2.1 | 4 | 96 |
| Example 12 | Fluororesin F-14 | 2.1 | 5 | 96 |
| Example 13 | Fluororesin F-15 | 2.1 | 6 | 96 |
| Example 14 | Fluororesin F-16 | 2.1 | 5 | 96 |
| Example 15 | Fluororesin F-17 | 2.1 | 4 | 95 |
| Example 16 | Fluororesin F-18 | 2.1 | 4 | 95 |
| Comparative Example 1 | Low-density polyethylene | 2.9 | 1500 | 30 |
| Comparative Example 2 | High-density polyethylene | 2.9 | 1500 | 30 |

From Table 4, it was revealed that the insulating materials molded in Examples 1 to 16 were lower in dielectric constant and dielectric loss tangent than the insulating materials molded in Comparative Examples 1 and 2. In particular, the insulating materials molded in Examples 1 to 8 and 10 to 16 in which the fluororesin comprised a TFE/PAVE copolymer, TFE/HFP copolymer or TFE/HFP/PPVE copolymer or a polymer alloy composed of a TFE/PAVE copolymer and a TFE/HFP copolymer were particularly low in dielectric constant and dielectric loss tangent and, further, they were high in oxygen index and thus found to be excellent in flame retardancy.

EXAMPLES 17 TO 24

The fluororesins specified in Table 5 were measured for MFR by the method described above under (3) and also measured for critical shear rate and MIT by the following evaluation methods.

(6) Critical Shear Rate Measurement of Fluororesins

Using a capillograph (product of Bohlin Instruments), each fluororesin was forced through an orifice having a diameter of 1 mm and a length of 16 mm under a varying shear stress at 360° C. and the shear rate ($sec^{-1}$) at which the fluororesin began to show melt fracture was recorded. The observation of the polymer surface for detecting melt fracture was made under a microscope at a magnification of 16.

(7) MIT Folding Endurance Measurement

Using a folding tester (product of Yasuda-Seiki-Seisakusho), the measurement was carried out according to ASTM D 2176 at room temperature under a load of 1.25 kg; the folding angle was ±1350. The test specimens were prepared by molding each fluororesin into a 220-µm-thick film and punching out 13-mm-wide strips therefrom.

The results are shown in Table 5.

TABLE 5

| | Resin species | Composition [mole ratio] | Melting point [° C.] | MFR [g/10 minute] (measurement temperature) | Critical shear rate ($sec^{-1}$) | MIT (cycle) |
|---|---|---|---|---|---|---|
| Example 17 | Fluororesin F-1 | TFE/PPVE = 98.0/2.0 | 300 | 63 (372° C.) | 240 | 4100 |
| Example 18 | Fluororesin F-2 | TFE/PPVE = 96.5/3.5 | 297 | 67 (372° C.) | 240 | 17000 |
| Example 19 | Fluororesin F-12 | TFE/PPVE = 97.4/2.6 | 300 | 63 (372° C.) | 240 | 6500 |
| Example 20 | Fluororesin F-13 | TFE/PPVE = 97.4/2.6 | 300 | 67 (372° C.) | 240 | 6000 |
| Example 21 | Fluororesin F-14 | TFE/PPVE = 97.4/2.6 | 300 | 77 (372° C.) | 250 | 5500 |
| Example 22 | Fluororesin F-15 | TFE/PPVE = 97.1/2.9 | 300 | 90 (372° C.) | 290 | 5400 |
| Example 23 | Fluororesin F-16 | TFE/PPVE = 98.4/1.6 | 301 | 63 (372° C.) | 240 | 1500 |
| Example 24 | Fluororesin F-17 | TFE/PPVE = 98.4/1.6 | 301 | 46 (372° C.) | 135 | 3900 |

Comparison of Examples 17 and 19 with Example 23 revealed that TFE/PAVE copolymers with a PPVE unit content of 1.9 mole percent or higher are superior in MIT value in spite of little difference in MFR. In particular, it was found that TFE/PAVE copolymers with a PPVE unit content of 2.5 mole percent or higher are far superior in MIT value. Comparison between Example 17 and Example 24 revealed that TFE/PAVE copolymers with a PPVE content of 1.9 mole percent or higher can retain their high MIT values in spite of their high MFR values.

INDUSTRIAL APPLICABILITY

The fluororesin of the invention is suitably used, for example, as a insulating material for small-diameter electric wires which is required to have high electrical insulating properties and thin-wall forming ability.

The invention claimed is:

1. An electric wire insulating material obtained by insulating molding of a fluororesin,
wherein said fluororesin has a critical shear rate, at 360° C., of 240 to 290 $sec^{-1}$, and
said fluororesin comprises a tetrafluoroethylene/perfluoro (alkyl vinyl ether) copolymer and has a perfluoro(alkyl vinyl ether) unit content of 2.6 to 3.5 mole percent relative to all the monomer units.

2. The electric wire insulating material according to claim 1,
wherein the fluororesin has a melt flow rate, at 372° C., of more than 60 (g/10 minutes).

3. An insulated electric wire comprising a core wire and the electric wire insulating material according to claim 1.

4. The insulated electric wire according to claim 3, wherein the core wire has a diameter of 0.02 to 0.13 mm.

* * * * *